US009202480B2

(12) United States Patent
Xiang et al.

(10) Patent No.: US 9,202,480 B2
(45) Date of Patent: Dec. 1, 2015

(54) DOUBLE PATTERNING HARD MASK FOR DAMASCENE PERPENDICULAR MAGNETIC RECORDING (PMR) WRITER

(75) Inventors: Xiaohai Xiang, Danville, CA (US); Yun-Fei Li, Fremont, CA (US); Jinqiu Zhang, Fremont, CA (US); Hongping Yuan, Fremont, CA (US); Xianzhong Zeng, Fremont, CA (US); Hai Sun, Milpitas, CA (US)

(73) Assignee: Western Digital (Fremont), LLC., Fremont, CA (US)

( * ) Notice: Subject to any disclaimer, the term of this patent is extended or adjusted under 35 U.S.C. 154(b) by 1107 days.

(21) Appl. No.: 12/579,316

(22) Filed: Oct. 14, 2009

(65) Prior Publication Data

US 2011/0086240 A1    Apr. 14, 2011

(51) Int. Cl.
| | |
|---|---|
| B44C 1/22 | (2006.01) |
| C03C 15/00 | (2006.01) |
| H01L 21/4763 | (2006.01) |
| G11B 5/31 | (2006.01) |
| G11B 5/127 | (2006.01) |

(52) U.S. Cl.
CPC ............ *G11B 5/3116* (2013.01); *G11B 5/1278* (2013.01); *G11B 5/3163* (2013.01); *Y10T 428/11* (2015.01)

(58) Field of Classification Search
CPC .. G11B 5/1278; G11B 5/3116; G11B 5/3163; Y10T 428/11
USPC ............... 57/22; 216/22, 41, 58, 67; 428/810; 438/637, 712; 29/603.16, 603.01, 29/603.13, 603.15, 603.18; 360/125.03, 360/125.06, 313
See application file for complete search history.

(56) References Cited

U.S. PATENT DOCUMENTS

| | | | |
|---|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |

(Continued)

FOREIGN PATENT DOCUMENTS

CN    1177169 A    3/1998

OTHER PUBLICATIONS

Xianzhong Zeng, et al., U.S. Appl. No. 13/898,160, filed May 20, 2013, 12 pages.
Jinqiu Zhang, et al., U.S. Appl. No. 13/929,705, filed Jun. 27, 2013, 17 pages.
Jinqiu Zhang, et al., U.S. Appl. No. 14/046,790, filed Oct. 4, 2013, 26 pages.

(Continued)

*Primary Examiner* — Nadine Norton
*Assistant Examiner* — Christopher Remavege

(57) ABSTRACT

Various embodiments of the subject disclosure provide a double patterning process that uses two patterning steps to produce a write structure having a nose shape with sharp corners. In one embodiment, a method for forming a write structure on a multi-layer structure comprising a substrate and an insulator layer on the substrate is provided. The method comprises forming a hard mask layer over the insulator layer, performing a first patterning process to form a pole and yoke opening in the hard mask layer, performing a second patterning process to remove rounded corners of the pole and yoke opening in the hard mask layer, removing a portion of the insulator layer corresponding to the pole and yoke opening in the hard mask layer to form a trench in the insulator layer, and filling the trench with a magnetic material.

7 Claims, 10 Drawing Sheets

(56) References Cited

U.S. PATENT DOCUMENTS

| | | |
|---|---|---|
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |

(56) References Cited

U.S. PATENT DOCUMENTS

| | | |
|---|---|---|
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |

(56) References Cited

U.S. PATENT DOCUMENTS

| | | |
|---|---|---|
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 * | 11/2008 | Chung et al. ............... 29/603.16 |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |

(56) References Cited

U.S. PATENT DOCUMENTS

| | | |
|---|---|---|
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2006/0002021 A1* | 1/2006 | Li et al. .................... 360/126 |
| 2006/0225268 A1* | 10/2006 | Le et al. .................. 29/603.14 |
| 2007/0014048 A1 | 1/2007 | Sasaki et al. |
| 2007/0279802 A1 | 12/2007 | Sasaki et al. |
| 2008/0081461 A1 | 4/2008 | Lee et al. |
| 2008/0090418 A1 | 4/2008 | Jeon et al. |
| 2008/0316644 A1 | 12/2008 | Lee et al. |
| 2010/0290157 A1 | 11/2010 | Zhang et al. |
| 2011/0051293 A1* | 3/2011 | Bai et al. .................... 360/313 |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

OTHER PUBLICATIONS

Chinese Office Action dated Jun. 5, 2014 from related Chinese Application Serial No. 201010511811.X, 14 pages.

Chinese Office Action dated Jan. 4, 2015 from related Chinese Application Serial No. 201010511811.X, 13 pages.

* cited by examiner

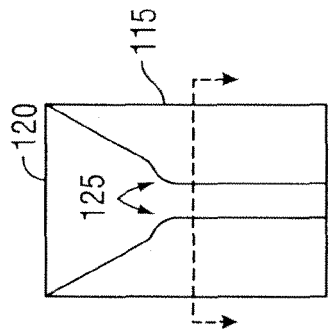
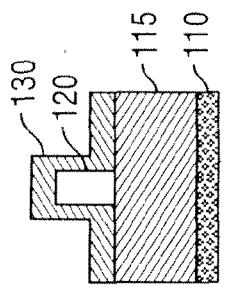
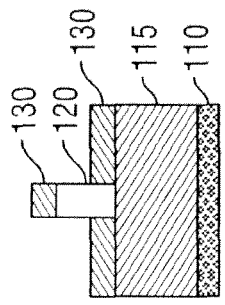
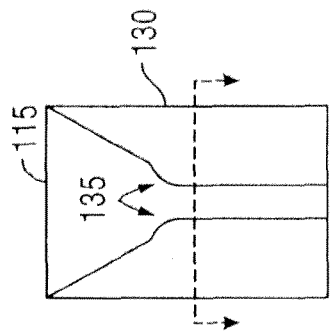
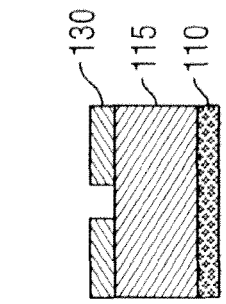
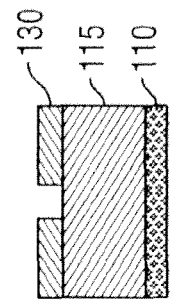
FIG. 1A (Prior Art)  FIG. 1B (Prior Art)  FIG. 1C (Prior Art)  FIG. 1D (Prior Art)

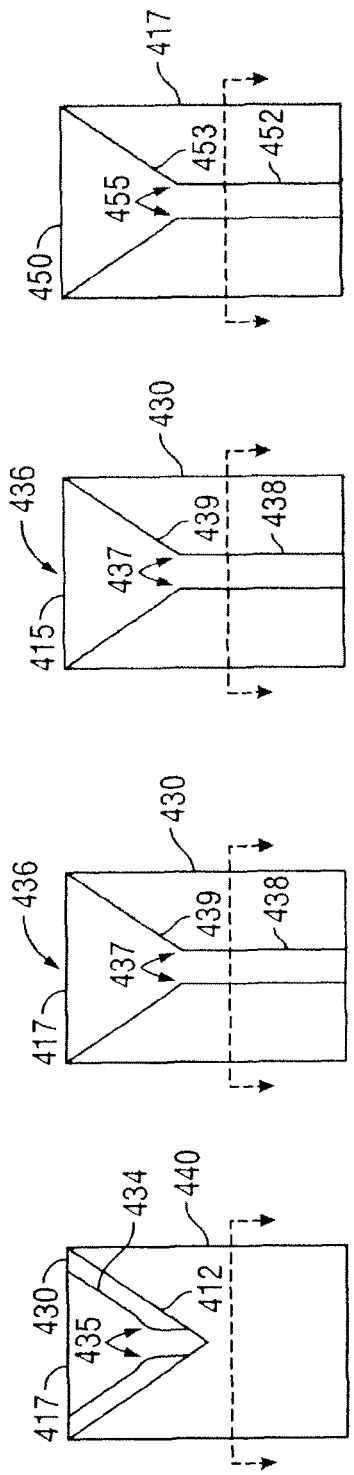

DOUBLE PATTERNING HARD MASK FOR DAMASCENE PERPENDICULAR MAGNETIC RECORDING (PMR) WRITER

FIELD OF THE INVENTION

The present invention generally relates to hard disk drives and, in particular, relates to fabrication of perpendicular magnetic recording (PMR) writers.

BACKGROUND OF THE INVENTION

Magnetic disk drives are used to store and retrieve data for digital electronic apparatuses such as computers. One example of a disk drive is a hard disk drive. A conventional hard disk drive includes a rotating magnetic disk, write and read heads that are suspended by a suspension arm adjacent to a surface of the rotating magnetic disk, and an actuator that swings the suspension arm to place the read and write heads over selected circular tracks on the rotating disk. The read and write heads are directly located on a slider that has an air bearing surface (ABS). The suspension arm biases the slider towards the surface of the disk, and when the disk rotates, air adjacent to the disk moves along with the surface of the disk. The slider flies over the surface of the disk on a cushion of the moving air.

When the slider rides on the air bearing, the write and read heads are employed for writing magnetic transitions to and reading magnetic transitions from the rotating disk. The read and write heads are connected to processing circuitry that operates according to a program to implement writing and reading functions.

Perpendicular magnetic recording (PMR) writers are now being utilized in write heads to increase the data density of hard disk drives. Such PMR writers record magnetic bits of data in a direction that is perpendicular to the surface of the magnetic disk. A PMR writer generally includes a write pole having a relatively small cross sectional surface at the air bearing surface (ABS) and a return pole having a larger cross sectional surface at the ABS. A magnetic write coil induces a magnetic flux to be emitted from the write pole in a direction generally perpendicular to the plane of the magnetic disk.

Traditionally, a PMR write pole is defined and fabricated using one-step photolithography and a subsequent reactive ion etch or ion-mill. FIGS. 1A-1E show a conventional PMR fabrication process using one-step photolithography.

FIG. 1A shows a top view and a cross-sectional view of a multi-layer structure comprising a substrate 110, an insulator layer 115 and a photoresist layer 120. The photoresist layer 120 is patterned to form a nose pattern in the photoresist layer 120 using one-step photolithography with one photo mask 210 (shown in FIG. 2A). The nose pattern comprises a pole pattern and a yoke pattern that tapers downward to the pole pattern. Due to the optical proximity effect, the corners 125 of the nose pattern are rounded, as shown in the top view in FIG. 1A.

In FIG. 1B, a ruthenium (Ru) layer 130 is deposited over the photoresist layer 120. In FIG. 1C, the Ru layer 130 on the sides of the photoresist layer 120 is removed using side milling. In FIG. 1D, the photoresist layer 120 and the Ru 130 layer on the top of the photoresist layer 120 are lifted off to transfer the nose pattern from the photoresist layer 120 to the Ru layer 130. As shown in the top view in FIG. 1D, the nose pattern transferred to the Ru layer 130 includes rounded corners 135 corresponding to the rounded corners 125 in the photoresist layer 120.

In FIG. 1E, the patterned layer Ru 130 is used as a hard mask for a reactive ion etch (RIE) to form a trench 140 in the insulator layer 115. The trench 140 includes a yoke trench and a pole trench. In a subsequent step, the trench 140 in the insulator layer 115 is filled with a magnetic material (not shown). The magnetic material in the pole trench forms a write pole.

In a later process, a portion of the write pole is lapped off to form a cross sectional surface at the ABS that faces the magnetic disk and though which magnetic flux flows from the write pole to the magnetic disk for writing data to the magnetic disk. The write pole is lapped along a plane that is perpendicular to the top view in FIG. 1E.

New generation PMR writers require very short nose lengths with no nose shape rounding and zero chisel angle at ABS to ensure high write performance and to reduce variations in write performance from device to device. Conventional PMR fabrication processes are unable to meet this require because of nose shape rounding due to the optical proximity effect.

SUMMARY OF THE INVENTION

Various embodiments of the subject disclosure solve the foregoing problems by providing a double patterning process that uses two patterning steps to produce a nose shape with sharp corners.

According to one embodiment of the subject disclosure, a method for forming a write structure on a multi-layer structure comprising a substrate and an insulator layer on the substrate is provided. The method comprises forming a hard mask layer over the insulator layer, performing a first patterning process to form a pole and yoke opening in the hard mask layer, performing a second patterning process to remove rounded corners of the pole and yoke opening in the hard mask layer, removing a portion of the insulator layer corresponding to the pole and yoke opening in the hard mask layer to form a trench in the insulator layer, and filling the trench with a magnetic material.

According to another embodiment of the subject disclosure, a method for forming a write structure on a multi-layer structure comprising a substrate and an insulator layer on the substrate is provided. The method comprises forming a hard mask layer over the insulator layer, performing a first patterning process to form a pole opening in the hard mask layer, performing a second patterning process to form a yoke opening in the hard mask layer, the yoke opening overlapping the pole opening, removing a portion of the insulator layer corresponding to the pole opening and the yoke opening in the hard mask layer to form a trench in the insulator layer, and filling the trench with a magnetic material.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings:

FIG. 1A-1E illustrate a conventional PMR fabrication process;

FIGS. 4A-4H illustrate a double patterning PMR fabrication process according to an aspect of the subject disclosure;

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

FIGS. 4A-4H show a double patterning PMR fabrication process for fabricating a write pole according to an aspect of the subject disclosure. The double patterning process uses two photolithography steps with two photo masks to produce a nose shape with sharp corners.

Figure 4A:
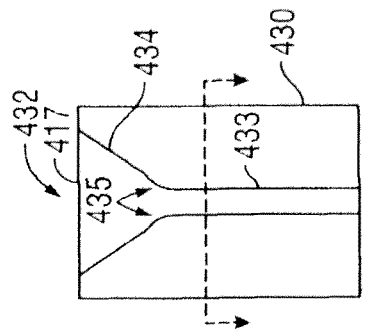

FIG. 4A shows a top view and a cross-sectional view of a multi-layer structure comprising a substrate 410, an insulator layer 415, a first hard mask layer 417, and a first photoresist layer 420. The insulator layer 415 may comprise alumina or other magnetically insulating material. The first hard mask layer 417 may comprise ruthenium (Ru).

The first photoresist layer 420 is patterned using a first photolithography step to form a pole and yoke pattern in the first photoresist layer 420. The first photolithography step uses a first photo mask 310 (shown in FIG. 3) to define the pole and yoke pattern. The pole and yoke pattern comprises a pole pattern 312 and a yoke pattern 315 that tapers downward to the pole pattern 312. The pole and yoke pattern in the first photo mask 310 is transferred from the first photo mask 310 to the photoresist layer 420 during the first photolithography step. However, due to the optical proximity effect, the corners 425 of the yoke and pole pattern in the photoresist layer 420 may be rounded instead of sharp, as shown in the top view in FIG. 4A.

Figure 1E:
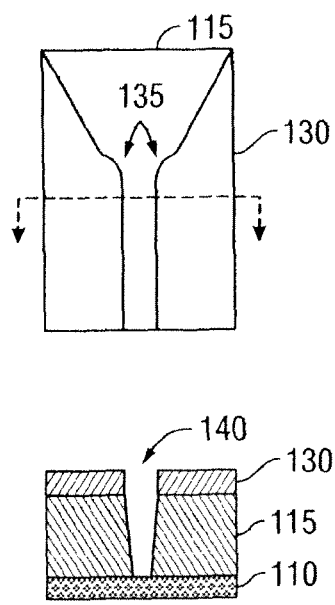
Figure 4B:
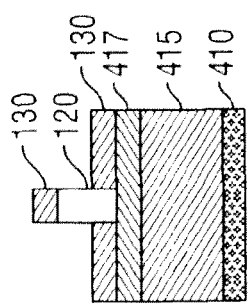
Figure 4C:
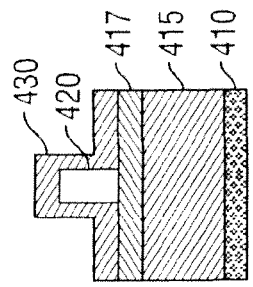
Figure 4D:
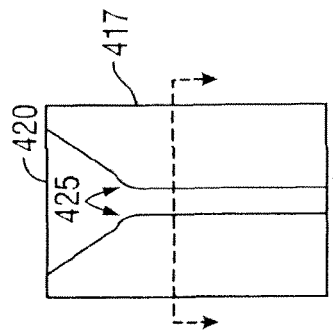

In FIG. 4B, a second hard mask layer 430 is deposited over the first photoresist layer 420 and the first hard mask layer 417. The second hard mask layer 430 may comprise tantalum (Ta). In FIG. 4C, the second hard mask layer 430 on the sides of the first photoresist layer 420 is removed using side milling. In FIG. 1D, the first photoresist layer 420 and the second hard mask layer 430 on the top of the first photoresist layer 420 are lifted off to transfer the pole and yoke pattern from the first photoresist layer 420 to the second hard mask layer 430. This forms a corresponding pole and yoke opening 432 in the second hard mask layer 430. The pole and yoke opening 432 includes a pole opening 433 and a yoke opening 434. As shown in the top view in FIG. 1D, the pole and yoke opening 432 may include rounded corners 435 corresponding to the rounded corners 425 in the first photoresist layer 420.

In FIG. 4E, a second photoresist layer 440 is deposited over the second hard mask layer 430 and the insulator layer 415. The second photoresist layer 440 is patterned using a second photolithography step to form a pattern that exposes the rounded corners 435 of the yoke and pole opening 432 in the second hard mask layer 430 and includes a yoke pattern 442 below the yoke opening 434 in the second hard mask layer 430, as shown in the top view in FIG. 4E. The second photolithography step uses a second photo mask 320 (shown with dashed lines in FIG. 3) to define the pattern in the second photoresist layer 440.

Figure 3:
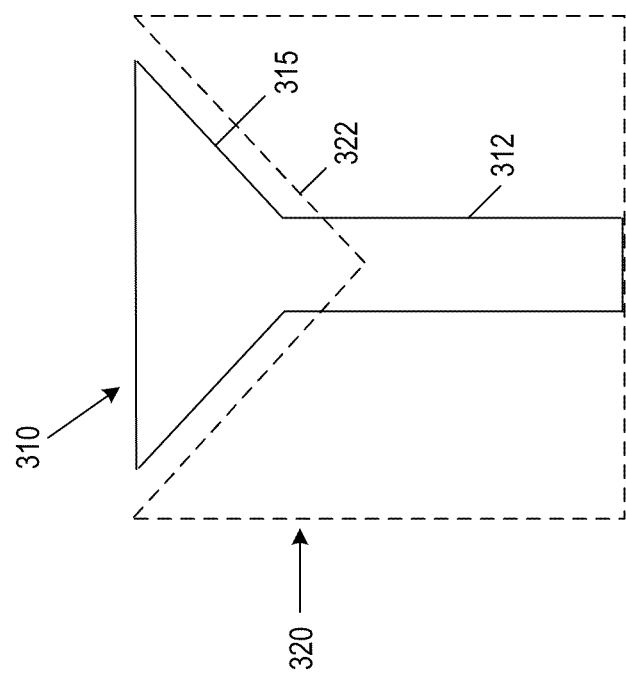
FIG. 3 illustrates two photo masks used in a double patterning PMR fabrication process according to an aspect of the subject disclosure.
Figure 2:
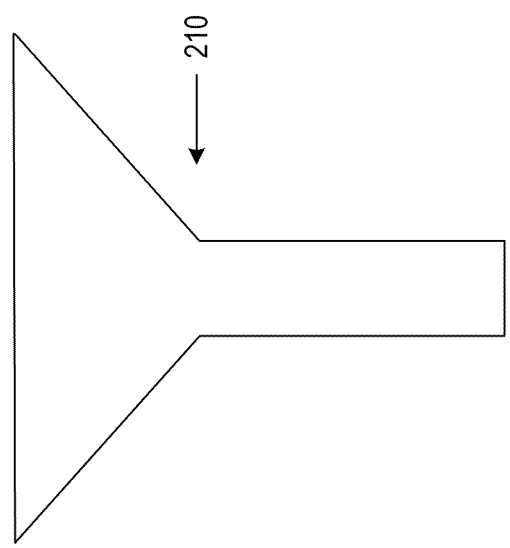
FIG. 2 illustrates a photo mask used in one-step photolithography in the conventional PMR fabrication process.

FIG. 3 shows both the first and second photo masks 310 and 320 including the relative position of the second photo mask 320 to the first photo mask 310. In FIG. 3, the outline of the second photo mask 320 is dashed to show the overlap between the first and second photo masks 310 and 320. The second photo mask 320 includes a yoke pattern 322 below the yoke pattern 315 of the first photo mask 310.

In FIG. 4F, the portion of the second hard mask layer 430 exposed by the second photoresist layer 440, which includes the rounded corners 435, is removed by a RIE. The second photoresist layer 440 is then stripped away. The RIE etches away the rounded corners 435 in the second hard mask layer 430 and transfers the yoke pattern 442 in the second photoresist layer 440 to the second hard mask layer 430. This results in a pole and yoke opening 436 with sharp corners 437 in the second hard mask layer 430, as shown in the top view in FIG. 4F. The pole and yoke opening 436 in the second hard mask layer 430 comprises a pole opening 438 defined by the first photolithography step using the first photo mask 310 and a yoke opening 439 defined by the second photolithography step using the second photo mask 320.

In FIG. 4G, the first hard mask layer 417 is etched with a RIE using the second hard mask layer 430 as a hard mask for the RIE. During the RIE, a portion of the first hard mask layer 417 exposed by the pole and yoke opening 436 in the second hard mask layer 430 is removed, transferring the pole and yoke opening 436 from the second hard mask layer 430 to the first hard mask layer 417.

In FIG. 4H, the insulator layer 415 is etched with an insulator RIE using the first hard mask layer 417 as a hard mask for the insulator RIE. During the insulator RIE, a portion of the insulator layer 415 exposed by the pole and yoke opening in the first hard mask layer 417 is removed. This forms a trench 450 in the insulator layer 115 having a nose shape with sharp corners 455. The trench 450 includes a pole trench 452 and a yoke trench 453. The insulator RIE also etches away the second hard mask layer 430. In a subsequent step, the trench 450 in the insulator layer 415 is filled with a magnetic material (not shown). The magnetic material in the pole trench 452 forms a write pole, and the magnetic material in the yoke trench 453 forms a write yoke that concentrates magnetic flux induced by magnetic write coils into the write pole.

In a later process, a portion of the write pole is lapped off to form an cross sectional surface ABS that faces the magnetic disk and though which magnetic flux flows from the write pole to the magnetic disk for writing data to the magnetic disk. The write pole is lapped along a plane that is perpendicular to the top view in FIG. 4H to form the cross sectional surface.

Thus, the double patterning PMR fabrication process results in sharp nose corners with substantially no rounding and zero chisel angle at ABS. The double pattering PMR fabrication substantially eliminates the nose corner rounding associated with conventional PMR fabrication processes.

Figure 6:
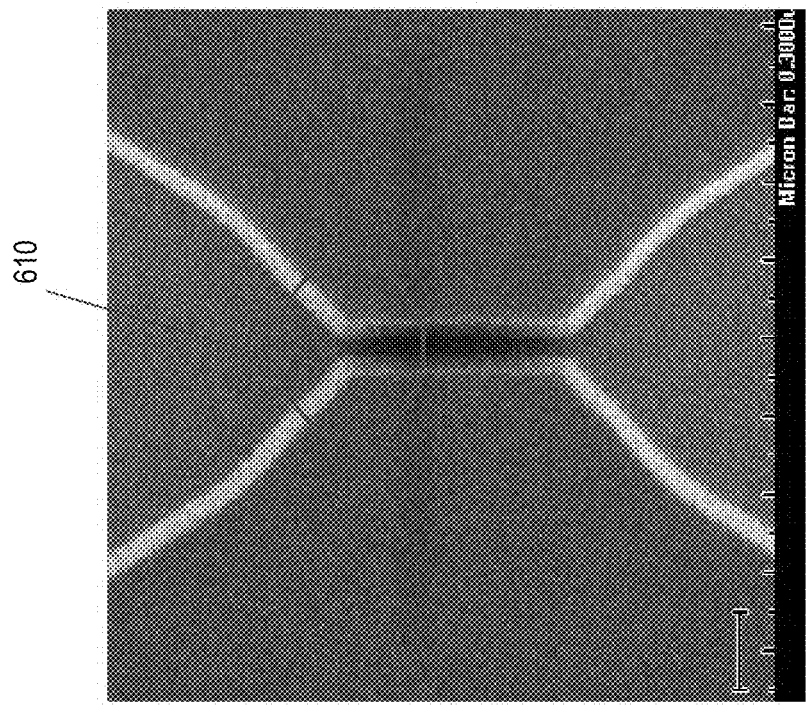
FIG. 6 shows a top-down CDSEM image of a nose shape after trench formation for a double patterning PMR fabrication process according to an aspect of the subject disclosure.
Figure 5:
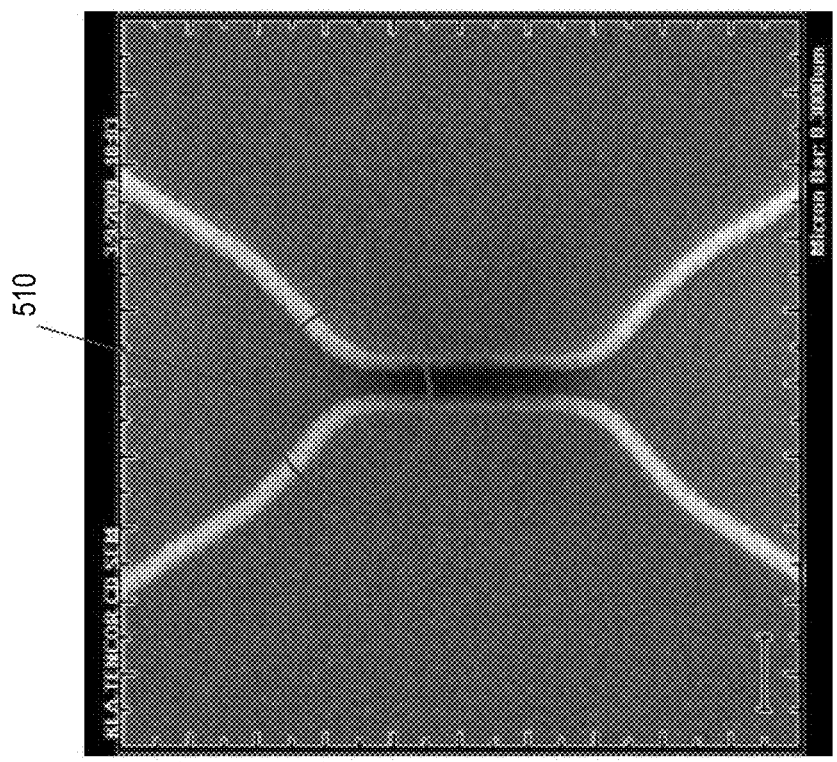
FIG. 5 shows a top-down critical dimension scanning electron microscope (CDSEM) image of a nose shape after trench formation for a conventional PMR fabrication process.

FIG. 5 shows a top-down critical dimension scanning electron microscope (CDSEM) image of the nose shape after RIE trench formation for a conventional PMR fabrication process using one photolithography step. FIG. 6 shows a top-down CDSEM image of the nose shape after RIE trench formation for the double patterning PMR fabrication process. As shown in FIG. 5, the conventional PMR fabrication process results in a nose shape having rounded corners 510. In contrast, as shown in FIG. 6, the double patterning PMR fabrication results in a nose shape having sharp corners 610. Thus, the image in FIG. 6 demonstrates that the double patterning PMR fabrication process substantially eliminates nose corner rounding.

Figure 7:
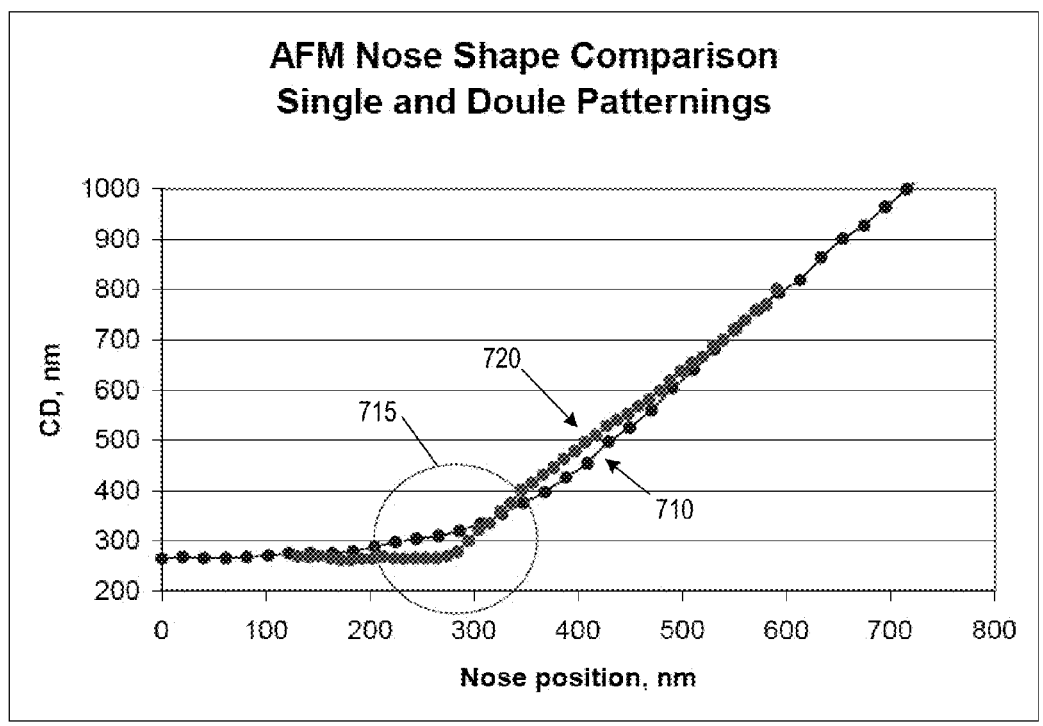
FIG. 7 shows nose shape comparisons between a convention PMR fabrication process and a double patterning PMR fabrication process according to an aspect of the subject disclosure.

FIG. 7 shows dimensions of a nose shape 710 for the convention fabrication process measured using atomic force microscope (AFM) metrology after trench formation. The measured nose shape 710 for the conventional fabrication process shows nose corner rounding in region 715 with no sharp transition between the yoke and the pole. FIG. 7 also shows dimensions of a nose shape 720 for the double patterning fabrication process measured using AFM metrology after trench formation. The measured nose shape 720 for the double patterning fabrication process shows a sharp corner in region 715, which provides a sharp transition between the yoke and the pole.

The nose corner rounding resulting from the conventional fabrication process causes variations in the width of the pole along the length of the pole. This can be seen in FIG. 7, where the width of the pole varies along the length of the pole, which extends from the left of the nose corner located at approximately 280 nm in FIG. 7. As a result of the pole width variation, the shape of the cross sectional surface of the write pole at the ABS is highly dependent on the position at which the write pole is lapped. In the example in FIG. 7, the shape of the cross sectional surface of the write pole is highly dependent on lapping position within a range of approximately 100 nm from the nose corner. Variations in lapping position among different write poles causes variations in the shape of their cross sectional surfaces, which in turn leads to variations in write performance among the write poles.

In contrast, the nose shape 720 resulting from the double patterning fabrication process exhibits a sharp corner that provides a sharp transition between the yoke and the pole. As a result, the pole is relatively straight along the length of the pole, which extends from the left of the nose corner located at approximately 280 nm in the example in FIG. 7. Because the pole is relatively straight, the width, and hence the shape of the cross sectional surface of the write pole, is much less dependent on lapping position. The significantly reduced dependence on lapping position, leads to much greater uniformity in the shape of the cross sectional surfaces and write performances among write poles.

Figure 8:
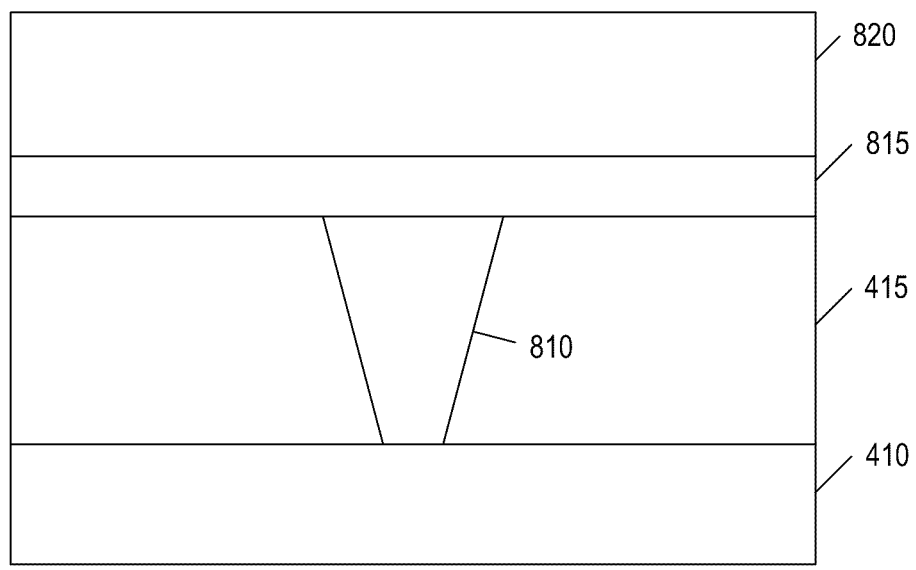
FIG. 8 illustrates a portion of a write head as viewed toward the ABS according to an aspect of the subject disclosure.

FIG. 8 illustrates a portion of a write head as viewed toward the ABS that may be formed by the double patterning PMR fabrication process. The write head may include the substrate 410, the insulator layer 415 (e.g., alumina), a write pole 810, a write gap 815 and a top shield 820. FIG. 8 shows the cross sectional surface of the write pole 810 that faces the magnetic disk. As discussed above, the cross sectional surface of the write pole 810 is defined by lapping the write pole at a distance from the nose corner along a plane perpendicular to the top view shown in FIG. 4H. To write data to the magnetic disk, magnetic flux is emitted from the cross sectional surface of the write pole 810 in a direction generally perpendicular to the cross sectional surface of the write pole 810 and the surface of the magnetic disk.

Figure 9:
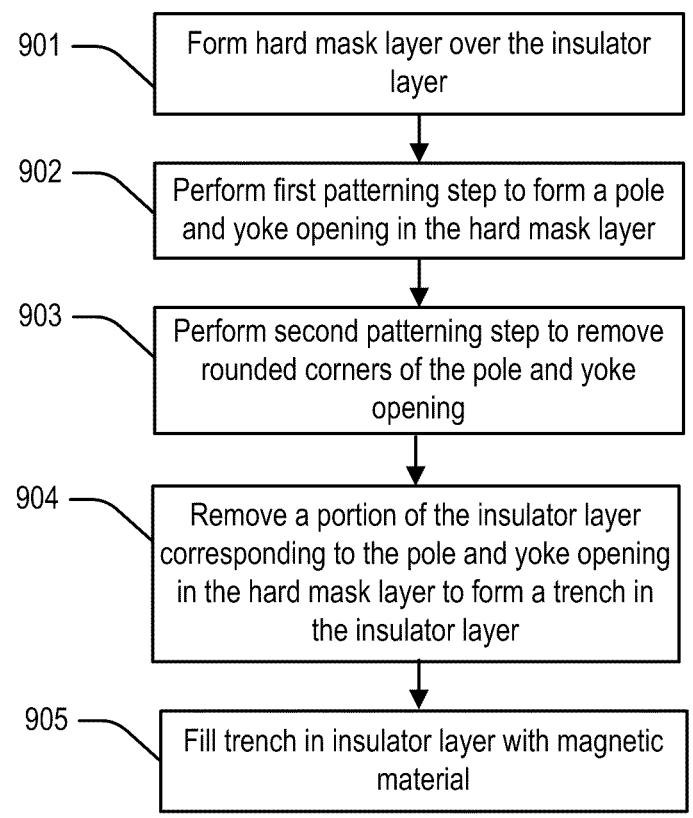
FIG. 9 is a flow chart illustrating a double patterning method for forming a write structure according to an aspect of the subject disclosure.

FIG. 9 illustrates a method for forming a write structure on a multi-layer structure comprising a substrate and an insulator layer on the substrate according to an aspect of the subject disclosure. The insulator layer may comprise alumina or other magnetically insulating material.

In step 901, a hard mask layer is formed over the insulator layer. The hard mask layer may comprise ruthenium (Ru), tantalum (Ta) or other material. In step 902, a first patterning process is performed to form a pole and yoke opening in the hard mask layer. Due to the optical proximity effect, the pole and yoke opening of the hard mask layer may have rounded corners. In step 903, a second patterning process is performed to remove the rounded corners of the pole and yoke opening in the hard mask layer. In step 904, a portion of the insulator layer corresponding to the pole and yoke opening in the hard mask layer is removed to form a trench in the insulator layer. In step 905, the trench in the insulator layer is filled with a magnetic material.

Figure 10:
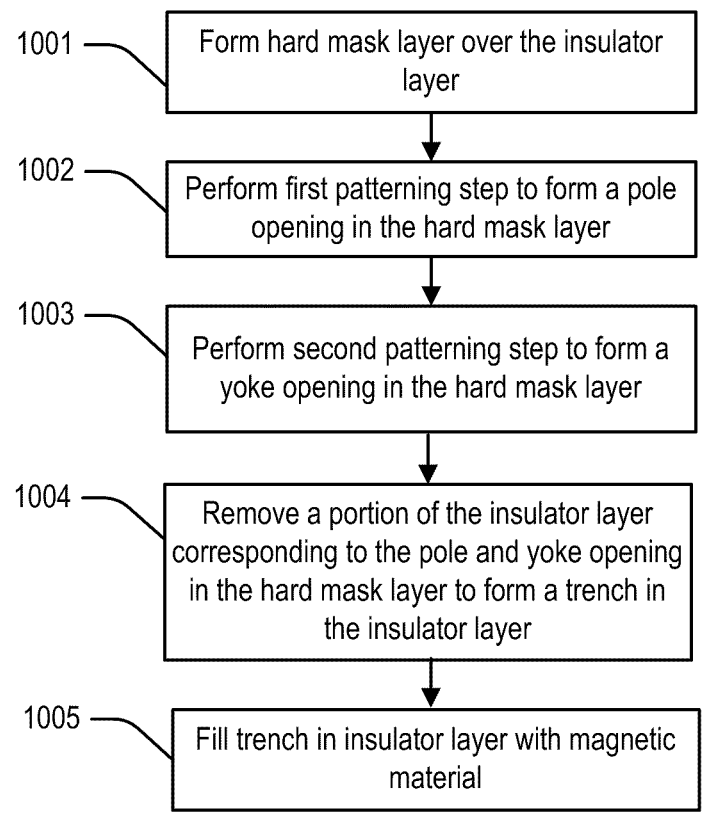
FIG. 10 is a flow chart illustrating a double patterning method for forming a write structure according to another aspect of the subject disclosure.

FIG. 10 illustrates a method for forming a write structure on a multi-layer structure comprising a substrate and an insulator layer on the substrate according to an aspect of the subject disclosure.

In step 1001, a hard mask layer is formed over the insulator layer. The hard mask layer may comprise ruthenium (Ru), tantalum (Ta) or other material. In step 1002, a first patterning process is performed to form a pole opening in the hard mask layer. In step 1003, a second patterning process is performed to form a yoke opening in the hard mask layer, the yoke opening overlapping the pole opening. In step 1004, a portion of the insulator layer corresponding to the pole opening and the yoke opening in the hard mask layer is removed to form a trench in the insulator layer. In step 1005, the trench in the insulator layer is filled with a magnetic material.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method for forming a write structure on a multi-layer structure comprising a substrate and an insulator layer on the substrate, the method comprising:
    forming a hard mask layer over the insulator layer;
    performing a first patterning process to form a pole and yoke opening in the hard mask layer;
    performing a second patterning process comprising forming a photoresist pattern on the hard mask layer, the photoresist pattern exposing the rounded corners of the pole and yoke opening in the hard mask layer, and removing a portion of the hard mask layer exposed by the photoresist pattern to remove the rounded corners of the pole and yoke opening in the hard mask layer;
    removing a portion of the insulator layer corresponding to the pole and yoke opening in the hard mask layer to form a trench in the insulator layer; and
    filling the trench with a magnetic material.

2. The method of claim 1, wherein the step of removing the portion of the insulator layer comprises:
    performing reactive ion etching on the portion of the insulator layer corresponding to the pole and yoke opening in the hard mask layer.

3. The method of claim 1, wherein the step of removing the portion of the insulator layer corresponding to the pole and yoke opening in the hard mask layer comprises:
    forming a second hard mask layer over the insulator layer prior to forming the first hard mask layer, wherein the first hard mask layer is formed over the second hard mask layer;
    transferring the pole and yoke opening from the first hard mask layer to the second hard mask layer; and
    removing a portion of the insulator layer exposed by the pole and yoke opening in the second hard mask layer.

4. The method of claim 3, wherein the step of performing the first patterning process comprises:
    forming a photoresist pattern on the second hard mask layer prior to forming the first hard mask layer, wherein the first hard mask layer is formed over the second hard mask layer and the photoresist pattern;
    removing a portion of the first hard mask layer along one or more sides of the photoresist pattern; and
    lifting off the photoresist pattern from the second hard mask layer.

5. The method of claim 4, wherein the step of performing the second patterning process comprises:
    forming a second photoresist pattern on the first hard mask layer, the second photoresist pattern exposing the rounded corners of the pole and yoke opening in the first hard mask layer; and
    removing a portion of the first hard mask exposed by the second photoresist to the remove rounded corners of the pole and yoke opening in the first hard mask layer.

6. The method of claim 1, wherein the hard mask layer comprises a hard mask material selected from a group consisting of tantalum and ruthenium.

7. The method of claim 1, wherein the insulator layer comprises alumina.

* * * * *